UNITED STATES PATENT OFFICE.

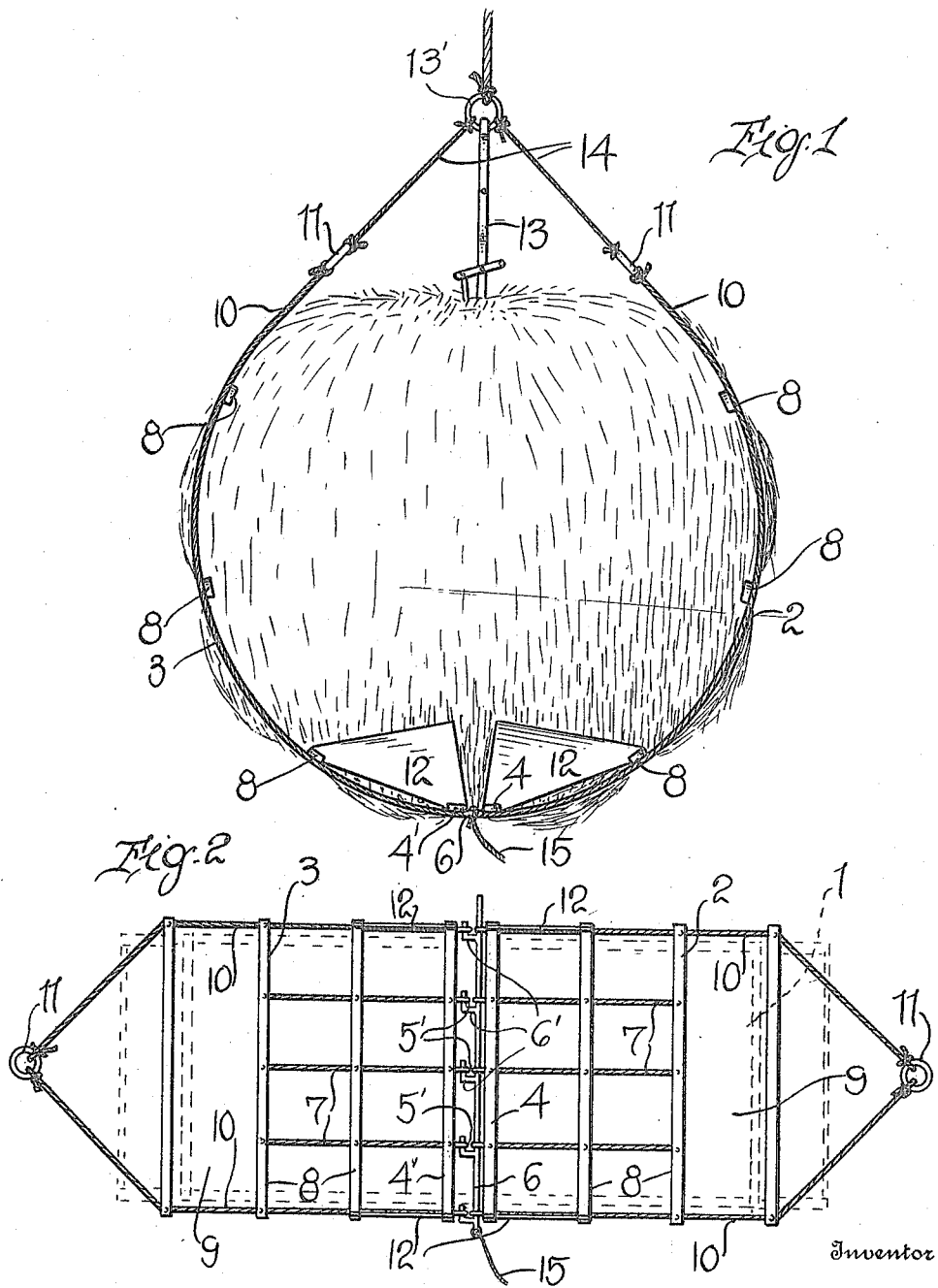

LEAVI S. BALLARD, OF HOLSTEIN, IOWA.

HAY-SLING.

1,135,249.　　　　Specification of Letters Patent.　　Patented Apr. 13, 1915.

Application filed August 13, 1914.　Serial No. 856,639.

*To all whom it may concern:*

Be it known that I, LEAVI S. BALLARD, a citizen of the United States, residing at Holstein, in the county of Ida and State of Iowa, have invented certain new and useful Improvements in Hay-Slings, of which the following is a specification, reference being had to the accompanying drawings.

This invention relates to new and useful improvements in hay slings and more particularly to a device of this character which is adapted to be applied to a hay unloading fork, the main object of the present invention being the provision of a hay sling which is attached to an unloading fork, so as to retain in connection with the fork a large load of hay, whereby a wagon or other conveyance may be quickly and readily unloaded of its contents.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a side elevation of a hay sling constructed in accordance with my invention, and illustrating the device in its operative position; and Fig. 2 is a top plan view.

Referring more particularly to the drawing, 1 indicates a hay rack, upon which my improved sling is mounted. The sling in itself comprises two pivotally connected sections, generally indicated by the numerals 2 and 3, each section having at its inner end a cross piece 4 having loops or rings 5 carried thereby and adapted to be arranged in alinement to receive the pivot pin 6. Each of the sections 2 and 3 are formed of what will be known as steel wire or cable and includes the longitudinal members 7, integrally connected and arranged in spaced relation by means of the slats 8, the cable terminating at a point next to the outer slat to provide an open space as shown at 9. The side cables or wires which are indicated by the numerals 10 extend outwardly and are loosely connected to a ring 11, the purpose of which will be hereinafter more fully set forth.

It will be noted from the showing in Fig. 2, that the pivot pin 6 is provided with a plurality of offsets 6', the ends of which are arranged in spaced parallel relation with the body of the pivot rod and adapted to be removably disposed within the eyes 5' formed upon the inner edge of the cross piece 4'. From this it will be apparent that by pulling outwardly upon the trip cord 15, the ends of the members 6' will be withdrawn from the loops or eyes 5' and release the two sections at the center thereof. Secured to the side cables 10 are the substantially pyramidal-shaped plates 12, which form guides to retain the hay in position upon the sling after being engaged with the same. As illustrated in Fig. 1, the sling surrounds a bundle of hay in which the fork has been engaged, for the purpose of removing the same from the hay rack.

The rings 11 are connected to the ring 13' by means of the ropes 14. It will be noted that the ring 13' is carried by the hay fork 13 and after the same has been engaged within the hay, the ropes 14 are secured thereto so as to rigidly retain the ends of the ring around the body of the hay. Thus, after the hay has been removed from the rack and transported to the place desired, the rope 15 is actuated to release the hook member 6' from the eyes 5' and permit the hay to drop from between the sections.

From the above description taken in connection with the accompanying drawing it will be readily apparent that I have provided a hay sling which can be laid upon the rack, during the placing of the hay thereon, so as to be arranged beneath the hay, when it is desired to remove the same from the wagon. In removing the hay from the wagon, the two rings 11 are brought up around the load and secured to the hay fork 13 after the same has been placed into the top of the hay. The hay is then raised and conveyed to any desired place. After the load has been placed in position to be dumped, the trip cord 15 is grasped and pulled downwardly to release the trip and allow the lower ends of the sections 2 and 3 to swing open, whereby to drop the hay load to its desired position.

It will be apparent from the foregoing that my device, as herein described, is extremely simple in construction and can be applied to any well known form of hay fork and, at the same time can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the class described including two pivotally connected sections, said sections each including transverse bars, longitudinally extending cables connecting said bars, the outer cables extending beyond the outer ends of the sections, a ring connecting said cables, removable means adapted to normally connect the inner ends of said sections, means whereby to actuate said connecting means and release the sections, and plates extending perpendicularly from each of said sections and arranged at each side thereof, as and for the purpose set forth.

2. A device of the class described including two pivotally connected sections, said sections each including transverse bars, longitudinally extending cables connecting said bars, eyes arranged upon the inner edges of the innermost bars of each section, a movable rod slidably mounted within the eyes at the inner ends of one of said sections, hook portions formed upon said rod and removably engaged within the eyes of the opposite section, a trip cord connected with one end of the rod, whereby to move the same longitudinally within the eyes and disengage the sections, and pyramidal-shaped plates arranged at the inner ends of each of the sections upon opposite sides thereof, whereby to prevent longitudinal movement of an object arranged upon opposite sides of the sections, as and for the purpose set forth.

In testimony whereof I hereunto affix my signature in the presence of two witnesses.

LEAVI S. BALLARD.

Witnesses:
ALBERT G. MERKLEY,
PETER J. A. SCHNOOR.

Copies of this patent may be obtained for five cents each, by addressing the "Commissioner of Patents, Washington, D. C."